Figure 1:
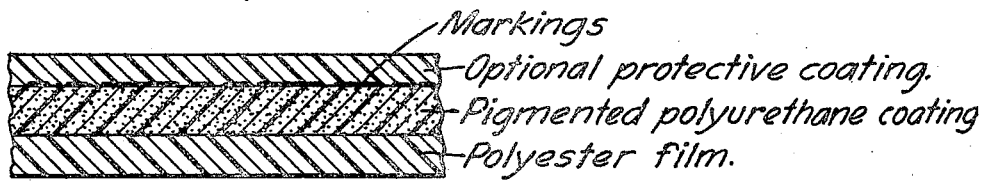

Nov. 24, 1964     T. EIKVAR ETAL     3,158,494
COATED POLYMERIC THERMOPLASTIC SHEET MATERIAL
Filed Aug. 21, 1962

- Markings
- Optional protective coating.
- Pigmented polyurethane coating
- Polyester film.

- Pigmented polyurethane coating
- Polyester film.
- Pressure-sensitive adhesive.

INVENTORS
TORE EIKVAR
LESTER C. KROGH
FRED R. LUECKE, JR.
BY
Carpenter, Abbott, Coulter & Kinney
ATTORNEYS 3,158,494
COATED POLYMERIC THERMOPLASTIC
SHEET MATERIAL
Tore Eikvar, Maplewood, Lester C. Krogh, Roseville, and Fred R. Luecke, Jr., White Bear, Minn., assignors to Minnesota Mining and Manufacturing Company, St. Paul, Minn., a corporation of Delaware
Filed Aug. 21, 1962, Ser. No. 218,423
11 Claims. (Cl. 117—45)

This invention relates to a durable, dimensionally stable, flexible sheet material comprising a polyurethane resin firmly adhered to a backing. A specific preferred aspect of the invention resides in printable sheet material, such as a map paper, which retains its original properties under a variety of adverse conditions. This application is a continuation-in-part of our application Serial No. 811,538, filed May 7, 1959, now abandoned.

For many years the most satisfactory printable sheet material has been paper, which is formed by the water-felting of cellulose fibers. Paper is convenient to handle, resistant to most organic solvents, and can be provided with a finish which is receptive to printing ink and which can be written on with either pen or pencil. Pencil markings can be readily and conveniently erased. The paper itself may be either translucent or opaque.

Despite its many advantages, however, paper is attacked by moisture, mold and mildew, and age discolors and embrittles it, especially in the presence of heat or ultraviolet light. Changing environmental humidities also cause paper to expand or contract, and if the distances between markings are critical, for example, where maps are printed on the paper, serious errors may occur.

Many attempts have been made to improve the physical characteristics of paper by either impregnating it with a resin or laminating it to other sheet products. Such attempts have resulted in products which not only are expensive but which also retain many of the fundamental frailties of cellulose.

Attempts have also been made to find substitutes for paper by coating a pigmented resin on a base of fabric, film, etc., to provide a surface which can be written or printed on. Frequently either the base itself or the resin coating is brittle at low temperatures, affected adversely by ultraviolet light or heat, or attacked by water or common organic solvents. Such products are frequently "tinny," and adhesion of the resin to the base is usually too poor to tolerate severe bending or rough handling, especially if an opaque coating is desired.

We have now devised a novel sheet material which has the appearance and printing characteristics of paper but which, even though subjected to moisture, heat, rough handling, light, etc., still maintains its original color, strength, and handling characteristics. For example, it is substantially unaffected by exposure for many months to sunshine and rain, and thus is useful for outdoor application. Similarly, it can be exposed for many months to high temperatures such as might be found in desert areas, or low temperatures such as occur in arcitic regions, all without noticeable effect on its physical properties. It can be folded and creased sharply, opened and folded again without cracking or peeling. It can be soaked in water and various solvents, oils or greases, as might happen to documents in wartime or notebooks in a chemistry laboratory. It can be printed on and written on with ink or pencil. Graphite markings can be erased without destroying the writing surface.

Our novel product is especially suitable for use as a backing for maps, particularly survival maps, where its flexibility, fold-resistance, dimensional stability, and weather-resistance prove very valuable. It may also, however, be used for an extremely wide variety of other purposes. For example, it can be used for the printing of governmental and industrial records which must be stored for long periods of time. Virtually indestructible propaganda pamphlets which can resist attack by the elements may be printed on the product of my invention. Ships' logs, or sails which are frequently subjected to high humidity, salt spray, and severe abuse can be made far more durable and resistant than was ever before possible. Readily cleanable wall paper, desk top coverings, movie screens, and window shades can be made from my novel coated sheet material. It may similarly be employed for currency, blueprints or the pages or covers of children's books, salesmen's sample books, or other products subjected to severe handling. A labeling tape may be prepared by applying a pressure-sensitive adhesive to one side. The surface of our novel sheet material is also receptive to many adhesives and resins, and thus effectively serves as a "primer" coating.

Our printable sheet material comprises a dimensionally stable heat- and solvent-resistant support sheet coated on one or both surfaces with a firmly adherent flexible film-forming pigment-containing resin having as an essential ingredient a polyurethane derived from various hydroxyl-terminated polyethers and polyesters. As a support sheet we generally prefer to use films of biaxially oriented linear polyester resins. Such polymeric esters are formed by reacting terephthalic acid with one or more of various ethylene glycols, although the esters may contain some amounts of other dibasic acids such as isophthalic and sebacic acids, and/or other types of glycols. Other strong flexible, highly polymeric films capable of orientation may also be used, such as films formed of polyethylene trans-1,4-cyclohexane dicarboxylate or "Luvitherm" polyvinyl chloride, although their degree of dimensional stability under a wide range of temperatures is somewhat less.

The polyurethane coating resin we employ possesses the combined advantages of flexibility, solvent-resistance, toughness, and adhesion. This resin contains as an essential ingredient the reaction product of (1) a polyester or polyether containing from about 0.1% to about 8% —OH groups by weight, and (2) a polyfunctional isocyanate. The polyester or polyether should have a low acid number, e.g., less than about 5, so that little or no reaction evolving carbon dioxide (and consequent foaming) occurs.

Suitable polyols include predominantly aliphatic polyesters such as chain-extended polyethylene adipate and polypropylene sebacate; branched chain aliphatic polyesters; and aromatic polyesters like polyethylene terephthalate. Other suitable polyols include polyethers like polyethylene glycols and polypropylene glycols. Suitable isocyanates include such diisocyanates as toluene 2,4 diisocyanate, toluene 2,6 diisocyanate,

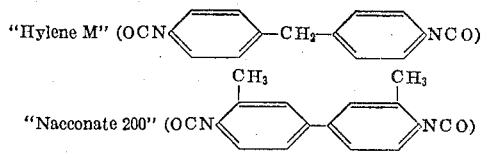

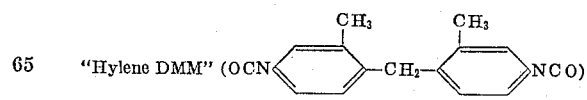

and

Figure 2:
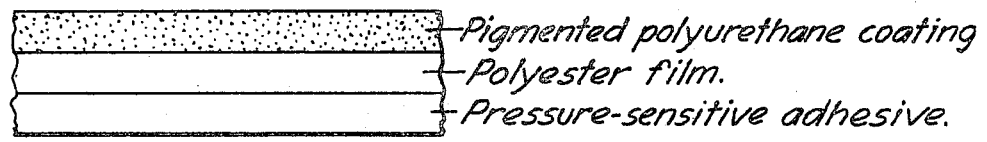

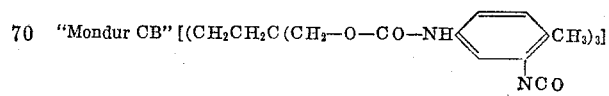

and such trifunctional isocyanates as 4,4′,4″-triisocyanatotriphenyl methane, polyphenyl polyisocyanate, and "Mondur CB" [$(CH_2CH_2C(CH_2-O-CO-NH\langle\phantom{x}\rangle CH_3)_3$]
$\phantom{xxxxxxxxxxxxxxxxxxxxxxxxxxxxxxxxxxxxxxxxxx}NCO$ In the accompanying drawings FIGURES 1 and 2 depict preferred embodiments of our invention. FIGURE 1 is a cross-sectional view of a structure in which markings have been applied to the face of our printable sheet material and an optional protective coating applied thereover. FIGURE 2 is an edge view of a sheet of our printable sheet material provided with a pressure-sensitive adhesive layer on the back surface.

Our invention will be further clarified by reference to the illustrative but non-limitative examples set forth below. In th examples all parts are by weight unless otherwise noted.

*Example 1*

An isocyanate chain-extended prepolymer capable of being further reacted to form a tough flexible polyurethane was prepared as follows:

In a 1-liter 3-necked reaction flask, fitted with a stirrer, gas inlet, outlet tubes, and a reflux condenser, was placed 100 parts of a polyethylene glycol adipate polyester having a hydroxyl number of 58.5, an acid number of 1.5, and an average molecular weight of 1880. The polyester was dried for 1½ hours by heating in an oil bath at 95 to 105° C., and by gradually reducing the pressure to 1 mm. Hg absolute, while nitrogen was blown over the surface. To the dried polyester was then added 14.6 parts of 1,5 naphthalene diisocyanate, thereby providing a molar ratio of polyester:diisocyanate of 3:4. The reactants were then heated for 1½ hours at 95° C. to yield a chain-extended polyester-diisocyanate prepolymer adduct, which was dissolved by adding 1.9 parts of 1,4 butane diol, and continuing heating at 95° C. The viscosity of a 20% solution of this chain-extended polyester in ethyl acetate was 340 cps. at 20° C., and it contained 1.7% hydroxyl groups, having an acid number of 1.

A tracing film was prepared as follows:

To 100 parts of the 20% prepolymer solution described in the preceding paragraph was added 30 parts of "Purecal M" (a precipitated calcium carbonate having an average particle diameter of about 3–4 microns, sold by the Wyandotte Chemical Company), and 19.5 parts of "Mondur CB-75" (a 75% ethyl acetate solution of the reaction product of one mol of trimethylolpropane and 3 mols of toluene diisocyanate [1]). The polyester pro-

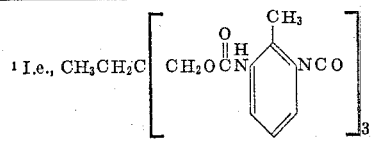

[1] I.e., $CH_3CH_2C\left[CH_2OC\overset{O}{\underset{H}{N}}\underset{}{\bigcirc}\!\!\!\!\!\!\!\!\!\!\!\!\!\!\!\!\!\!\!\overset{CH_3}{}NCO\right]_3$ vided 0.30 hydroxyl group for each "Mondur CB" isocyanate group, and on a solids basis the system contained about 25% pigment by volume. The components were mixed for ten minutes on an air mixer, after which a 2-mil wet coating was applied to one surface of a 2-mil "Mylar" biaxially oriented polyethylene terephthalate film and heated for 5 minutes at 300° F. to render the coating tack free and firmly adherent; after which it was cured 2 hours at 250° F. to further toughen it. The coating was translucent and yellow, having a matte surface which could be written on readily with a 4H or softer pencil, and from which pencil marks could be easily erased. The finished product could be repeatedly folded, creased, and subjected to rough handling without breaking or dislodging the pigmented coating.

The following example illustrates the formation of an opaque printable sheet material suitable for use as map paper, book covers, etc.

*Example 2*

The following ingredients (all described more fully later in this example) were milled for 120 hours on a 1-gallon ceramic ball mill containing about 200 ¾-inch diameter flint balls:

60 parts 21% ethyl acetate solution of "Multranil 176" polyester resin.
23 parts "Ti-Pure" titanium dioxide.
12.47 parts "No. 1 white" calcium carbonate.

The blended mixture was removed from the ball mill and 4.2 parts of Mobay trifunctional cross-linking agent "Mondur CB-75" was stirred in, the composition having 0.09 polyester hydroxyl groups per isocyanate group. This formulation was then applied to one side of a .0015-inch thick film of "Mylar" biaxially oriented polyethylene terephthalate and precured for 5 minutes at 300° F. The opposite side of the "Mylar" film was similarly coated and precured, and both coatings were then cured for 2 hours at 250° F. Each of the coatings, which contained about 40% pigment by volume, had an "egg shell" matte surface which could be written on with either pen or a 4H pencil, and the sheet material itself had a "hand" similar to that of rubber-saturated paper. The overall thickness of the sheet material was found to be .0027 inch (2.7 mils), and the weight about 3.0 ounces per square yard.

The sheet material of this example was repeatedly creased forward and backward at 180° and the crease line scraped with a finger nail. It was wadded into a ball, opened, and rewadded several times. The coating remained firmly adhered, and an ordinary electric iron heated to 300° F. was used to press out most of the wrinkles. When a commercial drawing film made by coating "Mylar" film with heavily pigmented, hydroabietate-plasticized cellulose nitrate was similarly handled, the coating flecked off readily.

A printed sample of the sheet material of this example, a sample of the modified cellulose nitrate-coated "Mylar" film, and a printed commercial paper impregnated with butadiene:acrylonitrile copolymer and pigment, and recommended for use under severe conditions, were stapled side by side to a hard-board panel and placed in a "Weatherometer," where they were subjected to accelerated aging by alternate exposure to moisture and ultraviolet light. After 50 hours, the cellulose nitrate coating on the "Mylar" was badly discolored and weakened, while the paper product was not only discolored, but also wrinkled, warped, and embrittled, the printing being easily removed with an ordinary rubber eraser. The sheet material of this example, however, was still white, and its dimensions remained unchanged after over 400 hours of exposure. Printing could be removed only by scraping off the pigment coating with a knife blade.

Other samples of the sheet products described in the preceding paragraph were then placed in a 250° F. oven for five hours. No appreciable change in color, "hand," strength, or dimensions of our material was detectable, whereas the tracing film was badly discolored and the modified cellulose nitrate showed decreased adhesion to the "Mylar." The paper samples were discolored, weakened, embrittled, and in fact rendered completely useless, by subjection to 250° F. heat for as little as ten minutes.

Still other samples of the sheet products described above were immersed in each of the following solvents: xylol, acetone, methyl ethyl ketone, ethyl acetate, ethyl alcohol, methyl isobutyl ketone, heptane, mineral spirits, machine oil, and tap water. The paper product swelled, weakened, distorted, and could be delaminated between the thumb and forefinger after 30 minutes in any of the above organic solvents, and it became very limp and similarly weakened after 24 hours in the tap water. The modified cellulose nitrate coating of the commercial tracing film was quickly dissolved by ethyl acetate, acetone, methyl ethyl ketone, and methyl isobutyl ketone, and greatly softened by ethyl alcohol. After well over two years, none of these treatments had caused any measurable change in dimensions or any detectable change in color, "hand," or other physical characteristics of the improved sheet of this example, which could even be boiled in tap water without losing any of its desirable properties.

"Multranil 176," the polyester resin used in this example, is sold by the Mobay Chemical Company. It is a crepe-like cream-colored somewhat crystalline hydroxy-terminated polyester prepolymer formed by reacting toluene diisocyanate with an excess of polyesters, comprising polyethylene adipate. The prepolymer has a nitrogen content of 1–2% measured as nitrogen, contains 0.17% hydroxyl groups, and has an acid number of 0. If the prepolymer is acetylated with acetic anhydride dissolved in pyridine, between one and six grams of potassium hydroxide is required to neutralize 1000 grams of prepolymer. "Multranil 176" has a specific gravity of about 1.24 and is soluble in esters like ethyl acetate and "Cellosolve" acetate, ketones like acetone and cyclohexanone, and chlorinated hydrocarbons like methylene dichloride. Benzene may be used as a diluent or latent solvent. A 20% solution of this prepolymer in ethyl acetate has a viscosity of about 1800 cps. as measured on a Brookfield Viscometer using a No. 3 spindle. This resin is substantially similar to that described in Example 1.

"Ti-Purse 610" titanium dioxide is manufactured and sold by E. I. du Pont de Nemours, Inc. The product contains about 94% rutile titanium dioxide, 2.1% aluminum oxide, .9% silicon dioxide, and 1% zinc oxide. The average particle size is about .8 micron.

"No. 1 White" calcium carbonate is a ground limestone supplied by the Thompson-Weinman Company. It has an average particle size of about 17 microns.

The following example shows the use of a pigmented polyurethane coating as a primer for polyethylene terephthalate film.

*Example-3*

A 42% natural rubber-resin adhesive solution was prepared according to Example 1 of U.S. Patent No. 2,410,053 and about 75 grains of the solution per 24 square inches applied to one surface of the product of Example 2 above. The solvent was then evaporated by heating 1 hour at 120° F. and 1 hour at 150° F., leaving a firmly-adherent pressure-sensitive coating. The resulting sheet material proved useful as a protective labeling tape, and could be printed with a design and used as wallpaper. The same adhesive has only fair adhesion to the surface of unprimed "Mylar." Similarly, other materials can be adhered to the coated surfaces of our novel sheet material, the coating functioning as a primer layer for such flexible adhesives and resins as acrylic polymers, butadiene:acrylonitrile copolymers, polychloroprene, adhesives which might serve as binders for abrasive granules, etc. When the polyurethane coating is used as a primer, the surface need not be writable, and is is unnecessary to employ any pigment at all. Pigment does, however, tend to detackify a soft polyurethane coating and may be included to improve handling properties.

*Further Examples*

Several sheet structures were prepared by coating on a surface of "Mylar" film the resin reaction products of various polyfunctional isocyanate and polyester or polyether reactants. Some coatings contained pigments; some did not. These structures are described in the following table:

| Example | 4 | 5 | 6 | 7 | 8 |
|---|---|---|---|---|---|
| Polyol | "By-176" Polyester | "By-176" Polyester | "By-176" Polyester | "By-176" Polyester | "Multron R-10" Polyester. |
| Percent—OH | 0.17 | 0.17 | 0.17 | 0.17 | 6.45. |
| Acid No. | 0 | 0 | 0 | 0 | 4. |
| Isocyanate Material | "Mondur CB-75" | "Mondur CB-75" | "Mondur CB-75" | "Mondur CB-75" | 80-20 blend of toluene 2,4 diisocyanate and toluene 2,6 diisocyanate. |
| Parts polyol/part isocyanate | 11.4 | 5.7 | 2.8 | 0.1 | 1.0. |
| -OH groups/-NCO group | 0.25 | 0.125 | 0.0612 | 0.0022 | 0.33. |
| Pigment or filler | None | None | 99% $CaCO_3$; .05% duPont oil yellow; .95% duPont oil red. | 50% $CaCO_3$; 50% $TiO_2$ | $CaCO_3$. |
| Percent Pigment or filler by volume | 0 | 0 | 37.2 | 44.5 | 32.4. |
| Adhesion | Fair | Fair | Good | Good | Good. |
| Flexibility | Good | Good | do | Fair | Do. |
| General Comments | Soft film; easily distorted, but useful as prime coat. | Soft film | Orange color; translucent, ink- and 3H pencil-receptive.[2] | Opaque; ink- and 4H pencil-receptive.[2] | Translucent; ink- and 4H pencil-receptive. |

| Example | 9 | 10 | 11 | 12 |
|---|---|---|---|---|
| Polyol | Polyethylene Glycol 600 | Polyethylene Glycol 4000 | "Multron R-10"[1] Polyester | "Multron R-10"[1] Polyester. |
| Percent—OH | 5.57 | 0.85 | 6.45 | 6.45. |
| Acid No. | 0 | 0 | 4 | 4. |
| Isocyanate Material | PAPI + | "Mondur CB-75" | "Mondur CB-75" | "Mondur CB-75". |
| Parts polyol/part isocyanate | 0.8 | 0.9 | 2.2 | 0.55. |
| -OH groups/-NCO group | 0.33 | 0.098 | 2.0 | 0.5. |
| Pigment or filler | $CaCO_3$ | $CaCO_3$ | None | $CaCO_3$. |
| Percent Pigment or filler by volume | 25.4 | 29.4 | 0 | 10. |
| Adhesion | Good | Good | Fair to good | Fair to good. |
| Flexibility | do | do | Good | Good. |
| General Comments | Translucent; ink- and 4H pencil-receptive.[2] | Translucent; ink- and 2H pencil-receptive.[2] | Soft film; easily distorted, but useful as prime coat. | Translucent, glossy. |

[1] Moderately branched polyester, sold by Mobay Chemical Co.; formed by reacting adipic acid, hexane triol, and butylene glycol.
[2] Pencil marks are readily erasable without injury to the film.

+ PAPI +    NCO    NCO    NCO, sold by Carwin Chemical Co. (approximate structure)

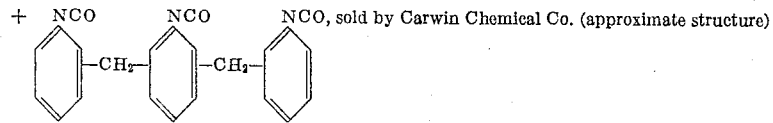

We have found that a wide variety of polyurethane coating resins can be employed in manufacturing the product of our invention; preferably such polyurethanes are derived from polyesters or polyethers which contain between about 0.1% and 8% aliphatic hydroxyl groups capable of reacting with polyfunctional isocyanates. Polyesters which have a fairly high degree of internal crystallinity (e.g., the Mobay "Multranil 176" polyester described in Example 2) require fewer aliphatic hydroxyl groups to produce satisfactory coatings than do more amorphous polyesters. If a polyester having a relatively high hydroxyl content (e.g., 5%) is employed, it is desirable either to react it with a relatively small amount of isocyanate (i.e., to provide a reaction mixture having between 0.5 and 2.0 hydroxyl groups per isocyanate group) or to employ a polyisocyanate having fairly long aliphatic chains separating the NCO groups, to prevent the formation of an excessively brittle structure. Contrariwise, polyesters or polyethers having a low hydroxyl content and a low degree of crystallinity, which normally would produce films too soft for use in our product, may be rendered usable by the crosslinking action of a "compact" or primarily aromatic polyfunctional isocyanate-bearing co-reactant.

It is generaly preferred that the polyisocyanate reactant be at least trifunctional and that the polyester or polyether be essentialy difunctional. If both the isocyanate reactant and the polyester or polyether reactant are primarily trifunctional, the resultant film structure tends to be brittle and to have poor adherence to the backing, although trifunctional polyesters containing a relatively low percentage of hydroxyl groups can be employed. Products which tend toward brittleness but which are satisfactory for many purposes can be formed by reacting a trifunctional polyester and a difunctional isocyanate, while products which are useful but relatively soft can be formed by reacting difunctional polyesters and difunctional isocyanates.

The number of hydroxyl groups per isocyanate group in the reaction mixture is also related to the end use of the coated sheet material. For example, a pigmented or unpigmented polyurethane which is to be used as a primer coating and which therefore may not need to provide a hard, durable surface per se, may contain as many as 2 hydroxyl groups per isocyanate group. On the other hand, a material to be used as a coating which can be written or printed on must be hard enough to withstand the pressures of the writing instrument, and generally no more than 0.5 hydroxyl group per isocyanate group should be present. If the amount of polyester or polyether coreactant present in the reactant system falls much below 10%, an excessive number of the isocyanate groups tend to react with each other to produce a brittle network and a consequently brittle coating. This is particularly true in the case of systems containing little or no pigment or in systems where the polyisocyanate molecule is "compact."

The surface characteristics of the pigmented polyurethane resin which is applied to the support sheet can be varied widely. If, for example, a glossy surface is desired, a relatively small ratio of pigment to resin may be used. We have found that a glossy surface is produced when less than 10% of the volume of the surface coating comprises pigment particles having an average diameter of about 10 microns. If the pigment particles have an average diameter in the neighborhood of one micron or less, somewhat higher amounts of pigment may be employed without destroying the glossy surface.

To produce a coated sheet material having a matte surface which can be printed or written on and from which pencil markings can be readily erased, we prefer to use substantially higher amounts of pigment. For such purposes, the resinous coating generally contains at least about 35% pigment by volume. If the amount of filler exceeds about 75% by volume, the physical characteristics of the pigmented coating are weakened, although the coated film still remains useful for certain purposes not involving extreme abuse. The use of excessive amounts of pigment or filler tends to embrittle the coating and to weaken its adhesion to the support sheet.

White pigments having a refractive index substantially different from the refractive index of the polyurethane coating resin (e.g., titanium dioxide) provide opacity, but many other pigments or fillers may be used to impart a wide range of characteristics to the finished product. For example, fillers having substantially the same refractive index as the coating resin (e.g., calcium carbonate) provide a coating which can be writtten on but which appears to be translucent. Transparent backings provided with filled coatings of the latter type are useful as substitutes for ground glass screens or as tracing "paper." Similarly, pigments such as bone black, molybdate red, cadmium orange, manganese blue, yellow iron oxide, phthalocyanine green, umber, and the like can be employed to produce colored or tinted coated sheet material.

Other fillers having more abrasive properties may also be employed for various purposes. For example, Grade 1000 and finer silicon carbide granules may be included in the coating resin, in an amount on the order of 35% by volume on a solids basis, to provide a uniform grey, chalk-receptive surface from which the chalk can be easily erased. The resultant sheet material also has abrasive properties, and is useful for fine polishing work. The quantity or particle size of the granules may be increased where more aggressive abrading action is desired.

Where we wish to impart a high degree of mechanical protection to a printed sheet of our novel material, we may apply an overcoating of an unpigmented polyurethane. Similarly, to impart additional water- and oil-repellence, we may apply a solution or emulsion of a vinyl type film-forming polymer having perfluoroalkyl side chains, e.g., such as are disclosed in U.S. Patents No. 2,782,184, 2,642,416 and 2,803,615.

Having now described our invention, what we claim is:

1. A strong, flexible, dimensionally stable sheet material which is capable of withstanding repeated creasing even at extremely low temperatures and which has a graphite- and ink-receptive surface from which graphite marks can be erased without substantial injury thereto, said sheet material being capble of retaining its desirable properties even when exposed to ultraviolet light, water, alcohols, hydrocarbons, esters, and ketones at a wide range of temperatures, said sheet material comprising a polyalkylene terephthalate film coated on at least one surface with a film-forming pigment-containing resin comprising the flexible cured reaction product of reactants consisting essentially of a polyfunctional isocyanate and a polyol selected from the group consisting of polyesters and polyethers, said polyol having an aliphatic hydroxyl content of between 0.1% and 8% and an acid number less than 5, said polyol being present in amounts sufficient to provide up to about 0.5 hydroxyl group per isocyanate group supplied by said polyfunctional isocyanate.

2. A product in accordance with claim 1 in which a pressure-sensitive adhesive is coated over one surface of said polyalkylene terephthalate film.

3. The sheet material of claim 1 in which one of the reactants is at least trifunctional and the other reactant is predominantly difunctional.

4. The sheet material of claim 3 in which the isocyanate reactant is at least trifunctional and the polyol reactant is primarily difunctional.

5. A heat-, organic solvent-, water-, and light-resistant, strong, flexible dimensionally stable sheet material capable of withstanding repeated creasing and having a graphite- and ink-receptive surface from which graphite marks can be readily erased, said sheet material comprising a biaxially oriented polyalkylene terephthalate film coated on at least one surface with a flexible, film-forming resin comprising the flexible cured reaction product of reactants consisting essentially of a polyfunctional isocyanate and a polyol selected from the group of polyethers and polyesters having a hydroxyl content of between 0.1% and 8% and an acid number less than 5, said polyol being present in amounts sufficient to provide up to about 0.5 hydroxyl group per isocyanate group supplied by said polyfunctional isocyanate, said resin containing from 20% to 75% pigment by volume.

6. An organic solvent-, water-, and light-resistant, strong, flexible dimensionally stable sheet material capable of withstanding repeated creasing and having a graphite- and ink-receptive surface from which graphite marks can be readily erased, said sheet material comprising a tough, flexible polyester film coated on at least one surface with a flexible, film-forming resin comprising the flexible cured reaction product of reactants consisting essentially of a polyfunctional isocyanate and a polyol selected from the group of polyethers and polyesters having a hydroxyl content of between 0.1% and 8% and an acid number less than 5, said polyol being present in amounts sufficient to provide up to about 0.5 hydroxyl group per isocyanate group supplied by said polyfunctional isocyanate, said resin containing from 20% to 75% pigment by volume.

7. A product in accordance with claim 6 in which said pigment has substantially the same refractive index as said film-forming resin.

8. A product in accordance with claim 6 in which marking is applied to the surface of said film-forming resin.

9. A strong, flexible, dimensionally stable sheet material comprising a polyethylene terephthalate film coated on at least one surface with a flexible, adherent, film-forming pigment-containing resin consisting essentially of the cured reaction product of a polyfunctional isocyanate reactant and a polyol reactant selected from the group consisting of polyesters and polyethers, said polyol having a hydroxyl content of between 0.1% and 8% and an acid number less than 5, said polyol being present in amounts sufficient to provide up to about 0.5 hydroxyl group per isocyanate group supplied by said polyfunctional isocyanate, and a coating applied over and firmly bonded to an exposed surface of said film-forming resin.

10. A strong, flexible, dimensionally stable sheet material having a chalk-receptive surface from which chalk marks can be readily erased, comprising a biaxially oriented polyalkylene terephthalate film provided on one surface with a flexible, adherent film-forming coating, said coating consisting essentially of the cured reaction product of a polyfunctional isocyanate and a polyol selected from the group consisting of polyethers and polyesters, said polyol having an aliphatic hydroxyl content of between 0.1% and 8% and an acid number less than 5, said polyol being present in amounts sufficient to provide up to about 0.5 hydroxyl group per isocyanate group supplied by said polyfunctional isocyanate, said coating containing on the order of 35% fine grade abrasive granules by volume.

11. A strong, flexible, dimensionally stable sheet material suited for use as a coated abrasive sheet, said sheet material comprising a biaxially oriented polyalkylene terephthalate film coated on at least one surface with a flexible adherent film-forming resin consisting essentially of the cured reaction product of a polyfunctional isocyanate reactant and a polyol reactant selected from the group consisting of polyethers and polyesters, said polyol having a hydroxyl content of between 0.1% and 8% and an acid number less than 5, said polyol being present in amounts sufficient to provide up to about 2 hydroxyl groups per isocyanate group supplied by said polyfunctional isocyanate, and abrasive granules firmly adhesively bonded to said polyalkylene terephthalate film over said one surface thereof.

References Cited in the file of this patent

UNITED STATES PATENTS

| | | |
|---|---|---|
| 1,629,259 | Crupi | May 17, 1927 |
| 1,992,176 | Benner et al. | Feb. 26, 1935 |
| 2,282,827 | Rothrock | May 12, 1942 |
| 2,676,164 | Charlton et al. | Apr. 20, 1954 |
| 2,698,241 | Saner | Dec. 28, 1954 |
| 2,723,935 | Rodman | Nov. 15, 1955 |
| 2,824,019 | Sapper | Feb. 18, 1958 |
| 2,955,961 | Koller | Oct. 11, 1960 |